US012340531B2

(12) United States Patent
Kalisperakis et al.

(10) Patent No.: US 12,340,531 B2
(45) Date of Patent: Jun. 24, 2025

(54) METHOD FOR EXTRACTING INFORMATION ABOUT A STAIRCASE FOR DESIGNING A STAIR LIFT

(71) Applicant: OTOLIFT TRAPLIFTEN B.V., Bergambacht (NL)

(72) Inventors: Ilias Kalisperakis, Athens (GR); Lazaros Grammatikopoulos, Athens (GR)

(73) Assignee: OTOLIFT TRAPLIFTEN B.V., Bergambacht (NL)

( * ) Notice: Subject to any disclaimer, the term of this patent is extended or adjusted under 35 U.S.C. 154(b) by 379 days.

(21) Appl. No.: 17/910,271

(22) PCT Filed: Mar. 16, 2021

(86) PCT No.: PCT/EP2021/056666
§ 371 (c)(1),
(2) Date: Sep. 8, 2022

(87) PCT Pub. No.: WO2021/190998
PCT Pub. Date: Sep. 3, 2021

(65) Prior Publication Data
US 2023/0114231 A1 Apr. 13, 2023

(30) Foreign Application Priority Data
Mar. 23, 2020 (NL) .................................. 2025188

(51) Int. Cl.
*G06T 7/60* (2017.01)
*B66B 9/08* (2006.01)
*G06T 7/13* (2017.01)

(52) U.S. Cl.
CPC .................. *G06T 7/60* (2013.01); *G06T 7/13* (2017.01); *B66B 9/08* (2013.01);
(Continued)

(58) Field of Classification Search
None
See application file for complete search history.

(56) References Cited

U.S. PATENT DOCUMENTS 11,597,634 B2 * 3/2023 Felis ..................... G06F 30/13
11,830,136 B2 * 11/2023 Huber ................... G06T 17/10
(Continued)

FOREIGN PATENT DOCUMENTS

WO 2013137733 A1 9/2013

OTHER PUBLICATIONS

International Search Report and Written Opinion for PCT/EP2021/056666, with a mailing date of Jun. 4, 2021 (nine (9) pages).
(Continued)

*Primary Examiner* — Tahmina N Ansari
(74) *Attorney, Agent, or Firm* — KDW Firm PLLC

(57) ABSTRACT

A method for the extraction of information about a staircase includes scanning the staircase with a 3D scanning device to obtain a point cloud of the surface of the staircase; calculating the estimated normal vector of at least a part of the points of the point cloud; filtering the at least part of the points based on their normal vectors by ignoring points which do not have a normal vector with a substantially vertically upward direction; ordering the remaining points into sets of points based on their vertical elevation so that each set of points represents a step; determining a straight edge line of each set, which edge line represents the respective step; and storing a numerical representation of each determined edge line in the digital memory.

15 Claims, 9 Drawing Sheets

(52) U.S. Cl.
CPC ........... *G06T 2207/10028* (2013.01); *G06T 2207/20021* (2013.01); *G06T 2207/30242* (2013.01)

(56) References Cited

U.S. PATENT DOCUMENTS

| | | | |
|---|---|---|---|
| 2015/0049187 A1* | 2/2015 | Van der Sluijs | G06T 7/579 348/135 |
| 2017/0243365 A1* | 8/2017 | Nuijten | B66B 9/0846 |
| 2018/0027224 A1* | 1/2018 | Javidnia | G06T 7/593 382/154 |
| 2018/0075648 A1* | 3/2018 | Moghadam | G01S 17/86 |
| 2019/0333237 A1* | 10/2019 | Javidnia | G06T 7/593 |
| 2020/0142074 A1* | 5/2020 | Huber | G01C 21/383 |
| 2020/0307959 A1* | 10/2020 | Felis | B66B 9/08 |
| 2021/0027477 A1* | 1/2021 | Huber | G06T 3/4023 |
| 2023/0114231 A1* | 4/2023 | Kalisperakis | G06T 7/50 382/181 |

OTHER PUBLICATIONS

Ciobanu et al., "Real-Time Indoor Staircase Detection on Mobile Devices," 2017 21st International Conference on Control Systems and Computer Science (CSCS), 2017, pp. 287-293, doi: 10.1109/CSCS.2017.46 (Abstract).

Pérez-Yus et al., "Detection and Modelling of Staircases Using a Wearable Depth Sensor", Mar. 20, 2015, 12th European Conference on Computer Vision, ECCV 2012; [Lecture Notes In Computer Science], Springer Berlin Heidelberg, Berlin Germany, pp. 449-463. https://doi.org/10.1007/978-3-319-16199-0_32.

International Preliminary Report on Patentability mailed Sep. 22, 2022, for PCT/EP2021/056666 (nine (9) pages).

\* cited by examiner

METHOD FOR EXTRACTING INFORMATION ABOUT A STAIRCASE FOR DESIGNING A STAIR LIFT

This application is a national stage filing under 35 U.S.C. 371 of pending International Application No. PCT/EP2021/056666, filed Mar. 16, 2021, which claims priority to Netherlands Patent Application No. 2025188, filed Mar. 23, 2020, the entirety of which applications are incorporated by reference herein.

The present invention relates to a method for the extraction of information about a staircase which includes steps.

The prior art regarding the measuring of staircases for assembling a stair lift comprises, inter alia, the so-called photogrammetry technology, wherein a multitude of photos of the staircase and the vicinity thereof are taken, which are used for making a 3-D model of the staircase and the vicinity thereof, and wherein subsequently a stair lift guide is virtually provided on the staircase and the dimensions of the various parts of the guide are determined by means of a CAD programme.

A drawback of this method is that taking the photographs and subsequently processing the information on the computer takes a relatively great deal of time and that the person taking the photographs of the staircase does not know whether enough photos have been taken and whether they have been taken correctly (as regards exposure and recording angle) and with sufficient overlap for making a sufficiently accurate 3-D model of the staircase and determining the dimensions of the parts with sufficient precision. It frequently happens, therefore, that the measurement must be carried out anew. Furthermore, the multitude of photographs take up a great deal of memory capacity, and sending them by electronic means takes a great deal of time.

Another method for the extraction of information about a staircase is described in WO 2013/137733 A1.

The object of the invention is to provide a quick and reliable method of obtaining geometric information about a staircase, in particular for use in the design of a guide of a stair lift.

To that end for the method for the extraction of information about a staircase which includes steps, use is made of:
- a 3D scanning device which is arranged to obtain point clouds of surfaces of objects; and
- a computer device comprising:
- a central processing unit which is loaded with a computer programme;
- a digital memory which is connected to the central processing unit;

and said method comprises the following steps:
- scanning the staircase with the 3D scanning device to obtain a point cloud of the surface of the staircase;
- calculate the estimated normal vector of at least a part of the points of the point cloud;
- filter said at least part of the points of the point cloud based on their normal vectors by ignoring points which do not have a normal vector with a substantially vertically upward direction;
- order the remaining points into sets of points based on their vertical elevation, so that each set of points represents a step;
- determine a straight edge line of each set, which edge line represents the respective step;
- store a numerical representation of each determined edge line in the digital memory.

Preferably the method further comprises the following steps for ordering the remaining points into sets of points based on their vertical elevation:
- determine one or more expected number of steps based on the difference in elevation of the bottom points and the upper points of the filtered point cloud and a predetermined step height value;
- applying to the filtered point cloud a robust plane fitting algorithm which detects horizontal planes, such as RANSAC, by using the expected number of steps;
- determine the vertical elevation of said horizontal planes.

Preferably the method further comprises the following step:
- before determining the straight edge line of each set of points, divide the points of each set into clusters which have no mutual connection, calculate the largest cluster, and ignore the points of the smaller cluster(s).

Preferably the method further comprises the following step:
- before determining the straight edge line of each set of points, calculate the center of mass of the set of points, determine the number of points inside a predetermined radius around the center of mass, and dismiss sets of points which have a number of points below a predetermined value.

Preferably the method further comprises the following step:
- before determining the straight edge line of each set of points, filter the points of the sets by applying a principal component analysis (PCA), in order to exclude thin objects detected as planes.

Preferably determining the straight edge line of each set of points comprises:
- determining boundary points of each set of points that belong to the boundary of said set of points;
- determining a fixed number of most dominant straight lines in the boundary, the most dominant lines being the lines that comprise the most points in the boundary;
- determine said edge line among said determined most dominant lines, by selecting from said most dominant lines the line which shows a difference in the elevation of points of the point cloud on either side of said line.

Preferably determining a fixed number of most dominant straight lines in the boundary is done with an iterative robust line-fitting algorithm, such as RANSAC.

Preferably the method further comprises the following step:
- assign an elevation to each determined edge line by calculating the median value of the elevations of the points of the corresponding set of points.

Preferably the numerical representation of each determined edge line comprises three-dimensional coordinates of the two respective endpoints of said edge line.

Preferably the method is used for designing and making a stair lift comprising a guide, in particular a rail, which is installed at the staircase and along which a frame on which a person can be seated can move.

The 3D scanning device and the computer device may be comprised in one housing.

The invention also relates to a computer device, comprising:
- a central processing unit which is loaded with a computer programme;
- a digital memory which is connected to the central processing unit;
- output means which are connected to the central processing unit;

wherein the computer programme comprises instructions for carrying out the method.

The invention also relates to a computer programme comprising instructions for carrying out the method.

The invention also relates to a computer readable carrier comprising a computer programme comprising instructions for carrying out the method.

The invention will now be explained in more detail with reference to a preferred embodiment shown in the figures, in which.

Figure 6:
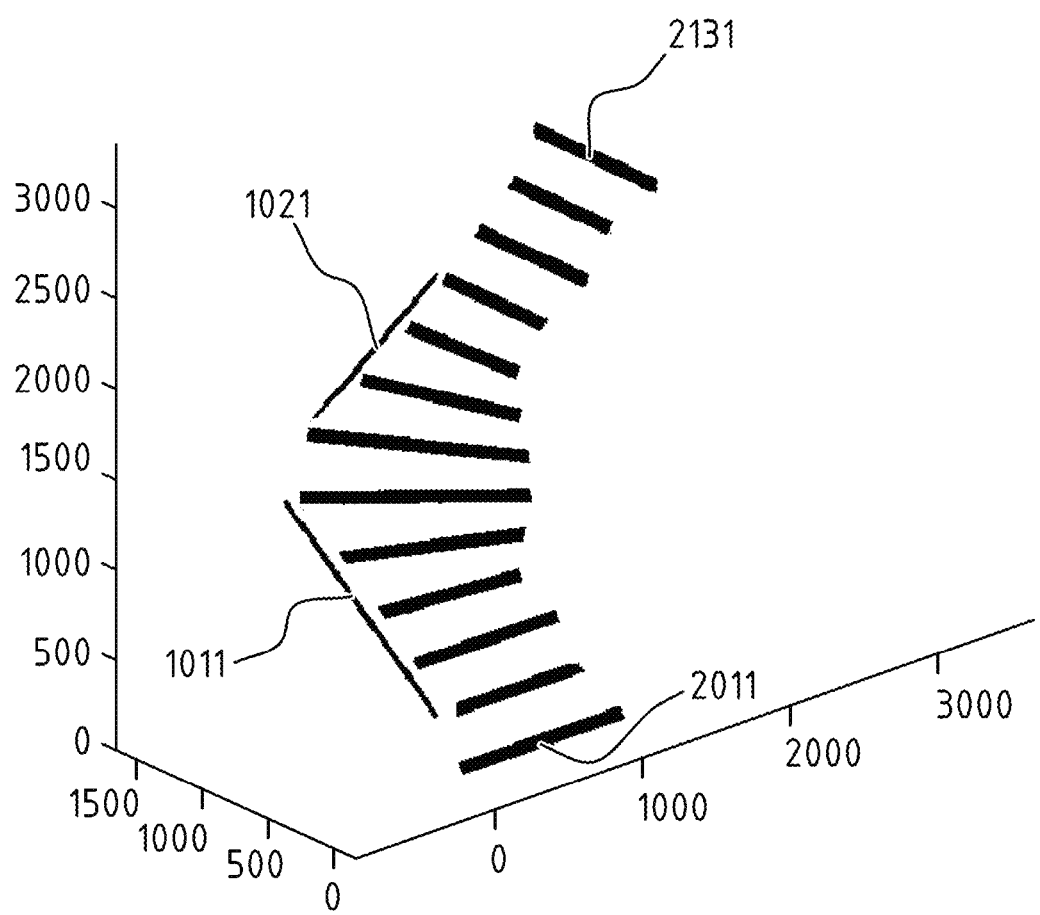

FIG. 5A-5M are images of the extracted point cloud clusters corresponding to the horizontal surfaces of the respective individual steps and floor parts of FIGS. 3B-3N and showing the determined edge line part of FIGS. 4A-4M of each step and the upper floor; and FIG. 6 is a perspective view image of the determined edge lines of FIGS. 5A-5M of each step and the upper floor part, and determined edge lines of the adjacent walls.

Figure 1:
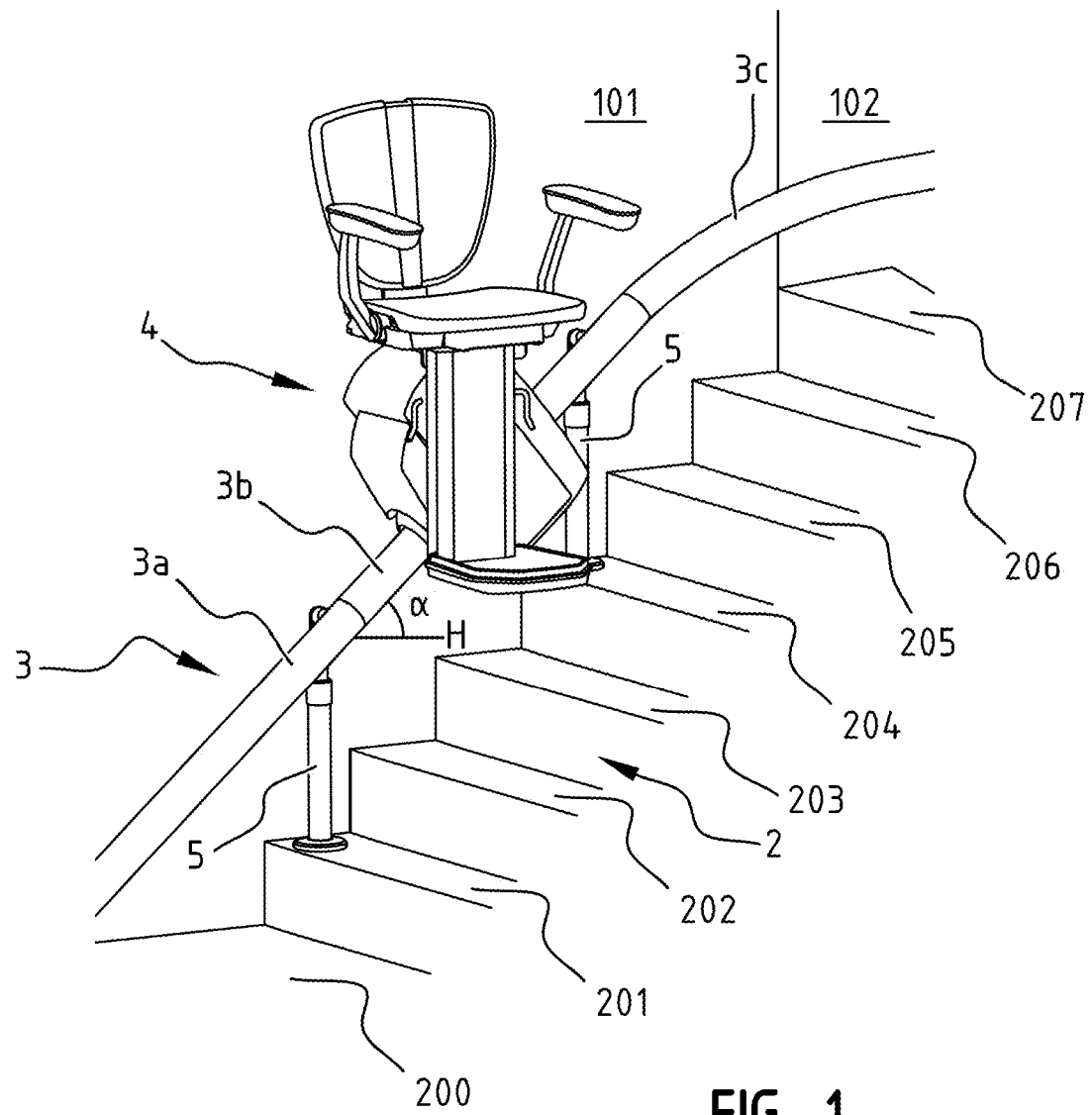
FIG. 1 is a perspective view of a staircase with steps, adjacent floor parts and walls, with a stair lift.

FIG. 1 shows a stair lift installation 1, which comprises a guide comprising a rail 3 mounted along a staircase 2 comprising bends, which rail includes an angle α with the horizontal H, and a device 4 for transporting a load between different levels, i.e. a stair lift in this case, which is movable along the rail 3. Such a stair lift is described in more detail in EP 2 216 284 A1.

The rail 3 is supported by a number of posts 5 provided along the staircase 2. The rail 3 is provided with a rack, which the motor of the movable device 4 can engage. The rail 3 consists of a number of rail parts 3a, 3b, 3c of different length and curvature.

In order to design the rail 3 of the stair lift, first a 3D scan of the staircase (including its steps, and the adjacent (parts of) wall(s) and (parts of) floor(s)) is made. For the obtaining the scan of a handheld 3D scanning device, such as a Mantis Vision™ F6 SMART Handheld Laser Scanner, can be used, which produces a point cloud of the surface of the staircase (including its steps, and the adjacent (parts of) wall(s) and (parts of) floor(s)). The obtained point cloud is a digital file comprising detected points of the surface of the staircase, which points are defined in an Cartesian coordinate system (x, y, z), wherein each point of said point cloud is defined by its Cartesian coordinates (x, y, z).

The following method is carried out on a computer, having a processor, a memory, input means and output means. A computer programme, which comprises instructions to carry out the following method, is stored in the memory of the computer, and the processor is arranged to carry out said instructions of the computer programme. The input of the following method is the digital file comprising the (unordered) point cloud obtained from the scanning device, and which file is input in the memory of the computer by means of the input means.

It is a goal of the following method to extract a solid geometric representation of the staircase from the unordered point cloud.

To that end the instructions of the computer programme, cause the processor of the computer to carry out the method with following steps:

Step 1. Reduce the number of points in the point cloud (which may comprise many million points) to a suitable number of points (preferably approximately 0.5-1 million) so that the end result can be obtained with reasonable computing resources in reasonable time.

Step 2. Estimate the normal vector of each point in the point cloud, i.e. determine the perpendicular direction with respect to its neighbouring points (such a method is well known and for instance described at https://www.mathworks.com/help/vision/ref/pcnormals.html).

Step 3. Filter points based on their normal vectors, by keeping only points with a normal vector close to the vertical (z) direction (up to a deviation of approximately 10 degrees); in this manner only points which potentially belong to horizontal planes of steps and adjacent floor parts are kept.

Step 4. Determine one or more expected number(s) of steps (201, 202, . . . 213) based on the elevation variance of the point cloud and a standard step height value.

Step 5. Determine sets of points representing potential steps and floor parts (201, 202, . . . 213) by applying to the filtered point cloud of step 3 a robust plane fitting algorithm (e.g. RANSAC) which detects horizontal planes (up to a deviation of approximately 5 degrees) by using the expected number(s) of steps; preferably this step is done iteratively for different numbers of expected steps, and best fitting result is used.

Step 6. Order the determined sets of points of the potential steps and floor parts (201, 202, . . . 213) based on their elevation, i.e. the z-coordinate values.

Step 7. For each determined set of points representing a potential step and floor part (201, 202, . . . 213) a sequence of filters may be applied to dismiss parts of the planes that do not correspond to steps or floor parts, such as preferably (and preferably in this order):

7.1 Segment the set of points of each potential step and floor part (201, 202, . . . 213) into clusters, calculate the largest cluster, and dismiss the smaller cluster(s).

7.2 Calculate the center of mass of the set of points of each potential step and floor part (201, 202, . . . 213), determine the number of points inside a predetermined radius around the center of mass, and dismiss sets of points which have a number of points below a predetermined number; said radius is related to an expected maximum dimension of the steps.

7.3 Filter the set of points of each potential step and floor part (201, 202, . . . 213) by applying a principal component analysis (PCA), in order to exclude thin objects detected as planes (delete steps with a large ratio between the two principal axes variances).

Figure 2:
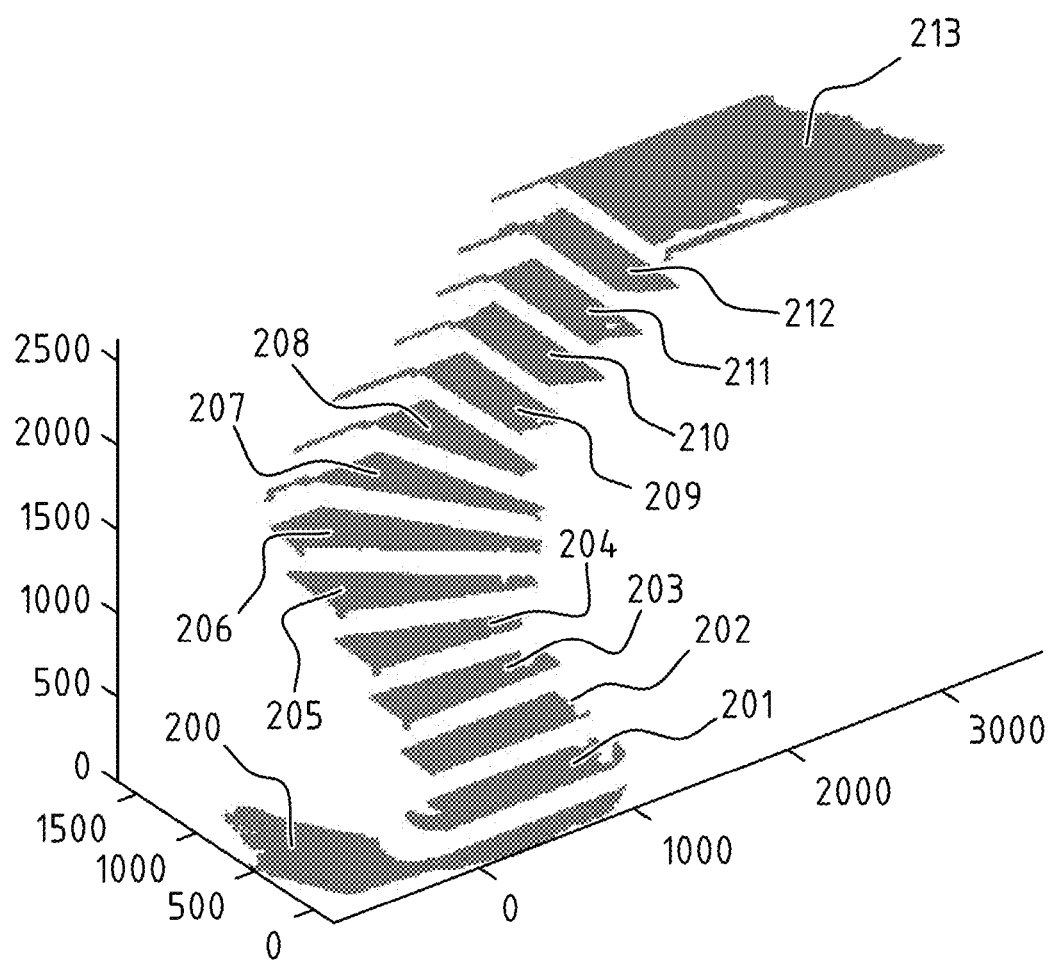
FIG. 2 is a perspective view of extracted point cloud clusters corresponding to horizontal surfaces of the steps of the staircase and the adjacent floor parts.

FIG. 2 shows an example of the respective extracted point cloud sets corresponding to respective steps and floor parts (200, 201, 202, . . . 213) in the three dimensional Cartesian coordinate system after steps 1-7 (wherein the x, y, z axes are in mm).

Figure 3A:
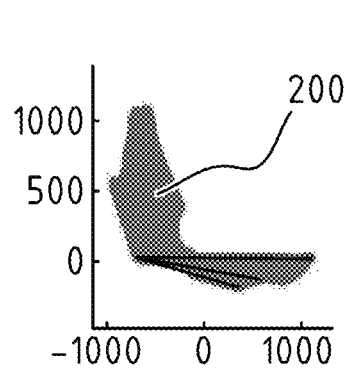
FIGS. 3A-3N are images of extracted point cloud clusters corresponding to horizontal surfaces of the respective individual steps and floor parts with determined boundary lines.
Figure 3B:
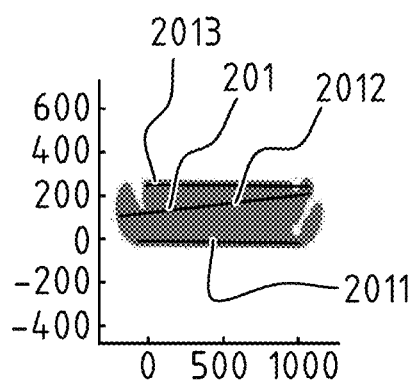
Figure 3C:
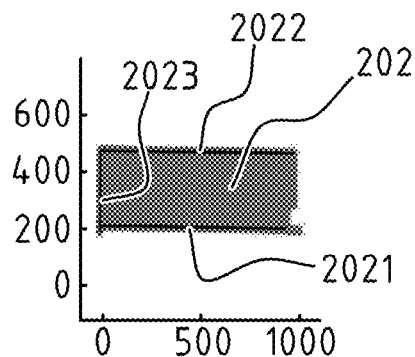
Figure 3D:
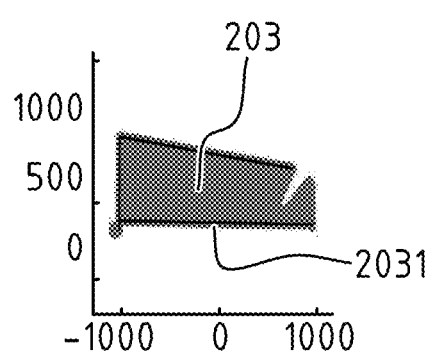
Figure 3E:
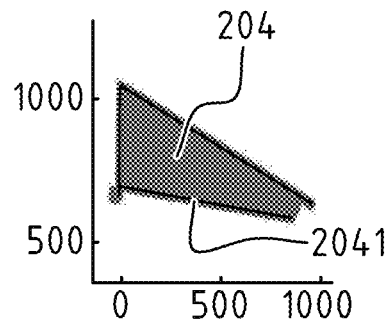
Figure 3F:
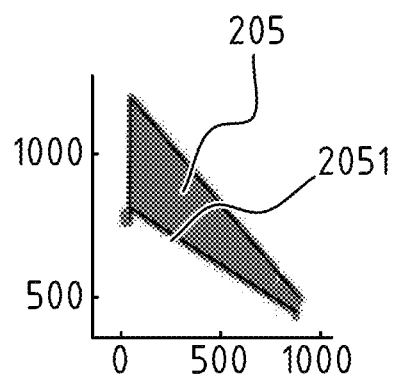
Figure 3G:
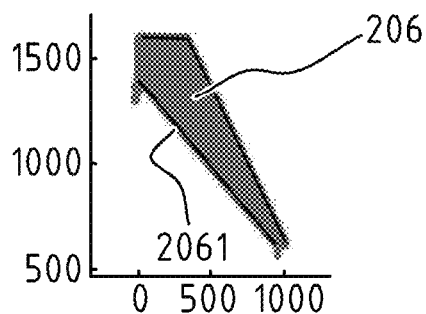
Figure 3H:
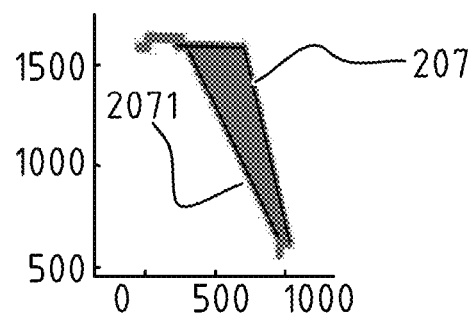
Figure 3I:
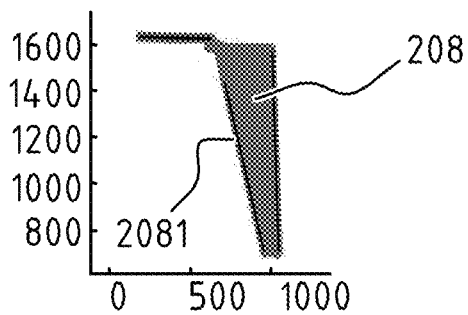
Figure 3J:
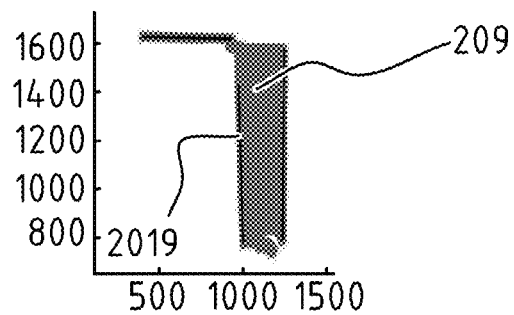
Figure 3K:
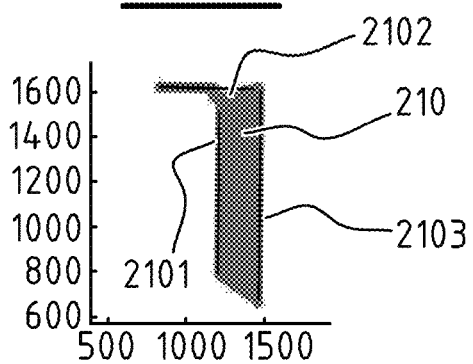
Figure 3L:
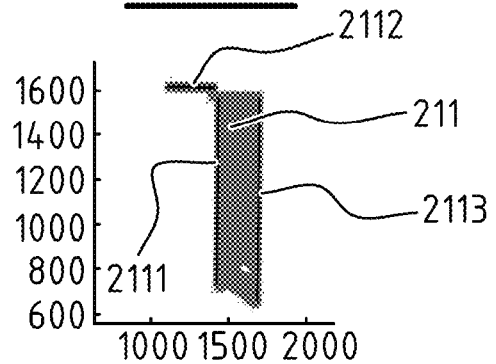
Figure 3M:
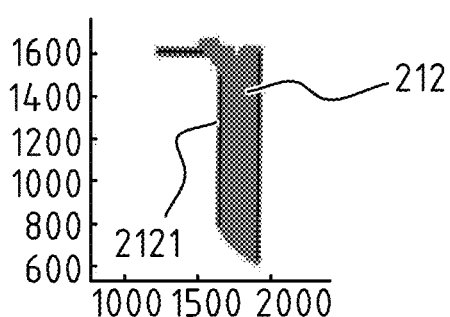
Figure 3N:
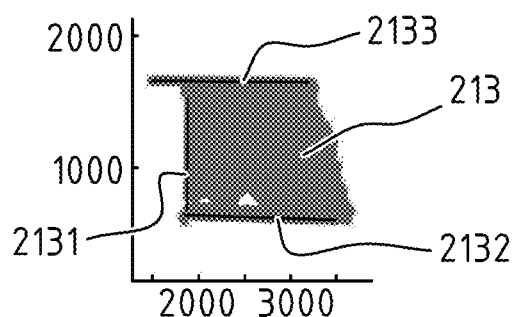
Figure 4A:
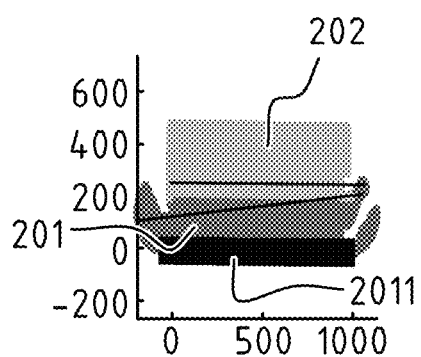
FIG. 4A-4M are images of the extracted point cloud clusters corresponding to the horizontal surfaces of respective pairs of adjacent individual steps and floor parts with the determined boundary lines of FIGS. 3A-3N, and showing the determined edge line that divides points that belong to each pair of adjacent individual steps and floor parts.
Figure 4B:
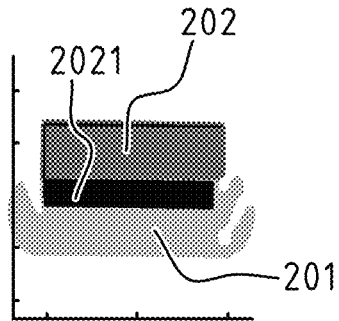
Figure 4C:
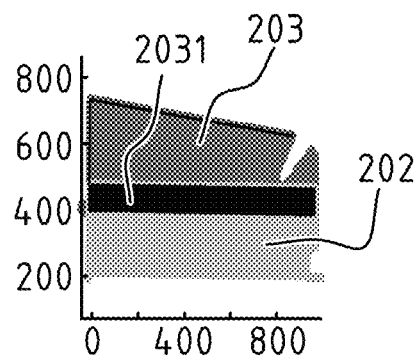
Figure 4D:
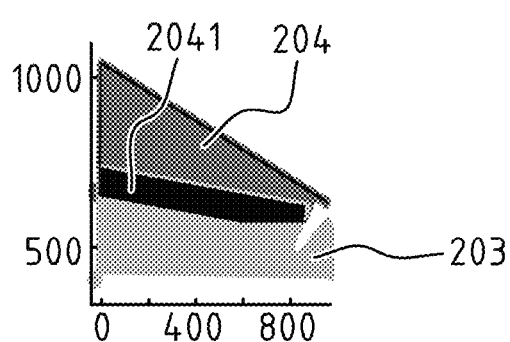
Figure 4E:
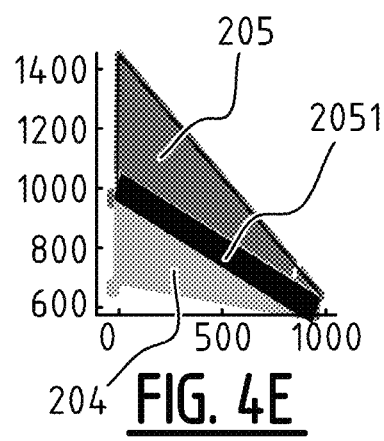
Figure 4F:
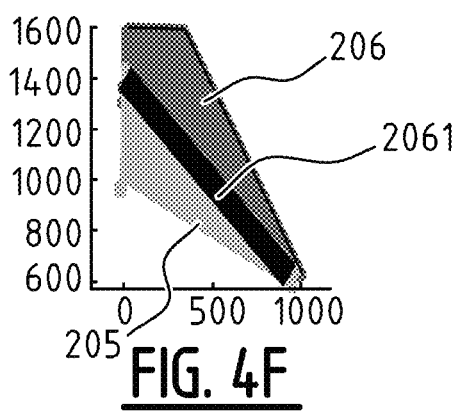
Figure 4G:
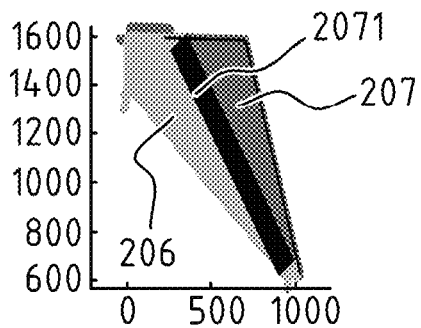
Figure 4H:
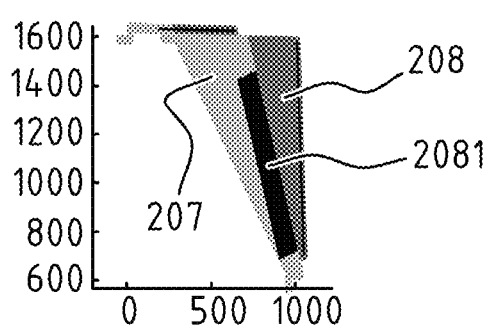
Figure 4I:
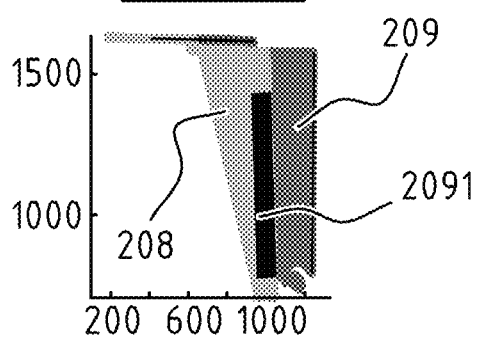
Figure 4J:
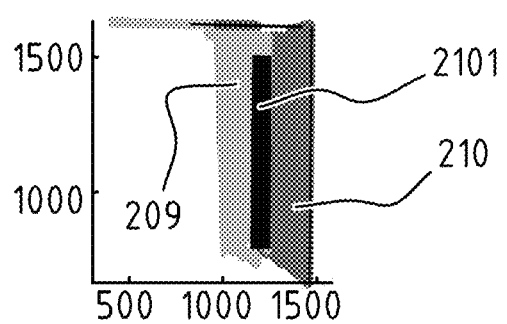
Figure 4K:
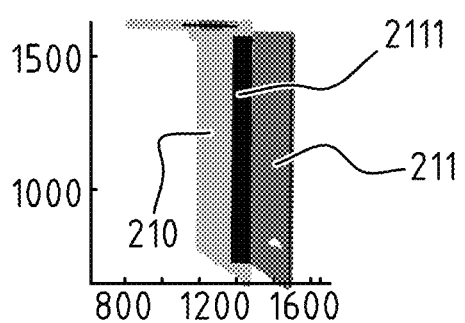
Figure 4L:
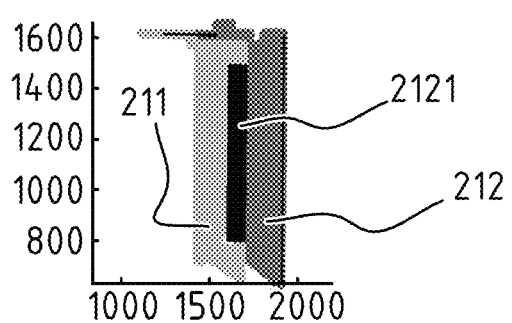
Figure 4M:
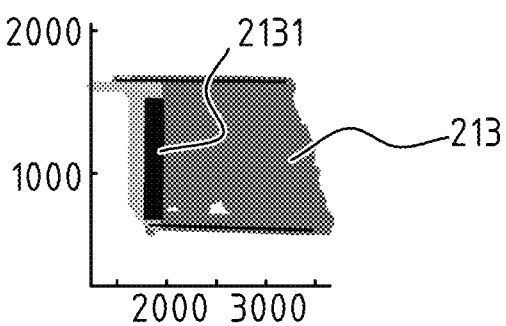
Figure 5A:
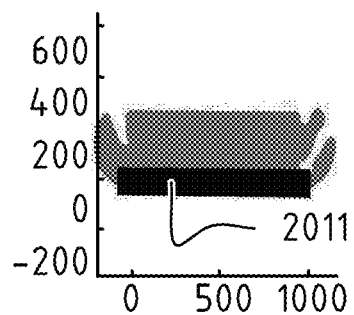
Figure 5B:
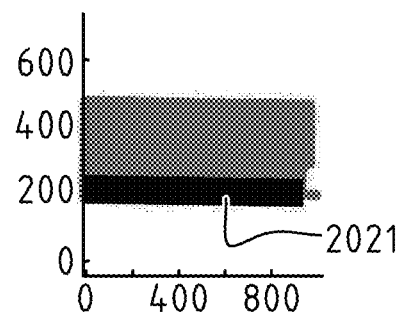
Figure 5C:
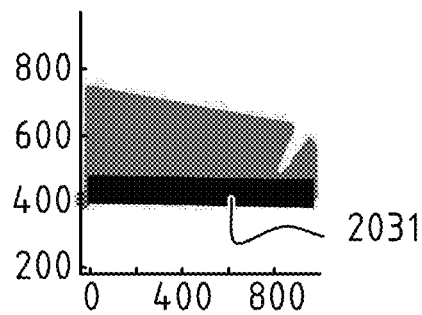
Figure 5D:
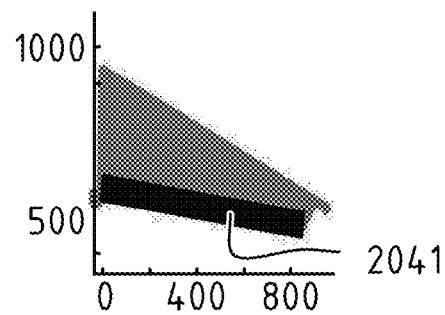
Figure 5E:
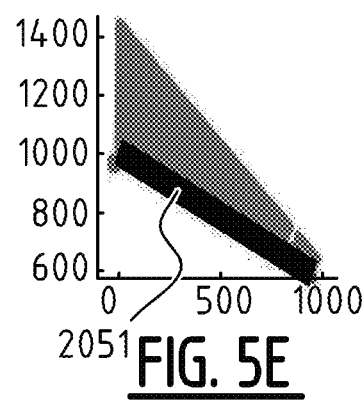
Figure 5F:
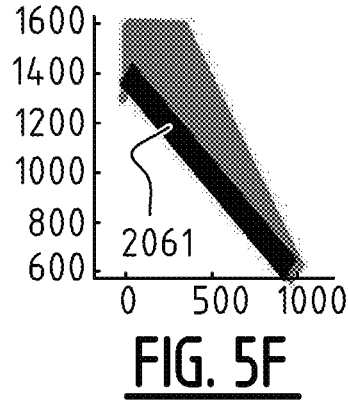
Figure 5G:
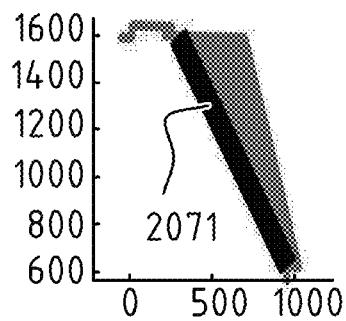
Figure 5H:
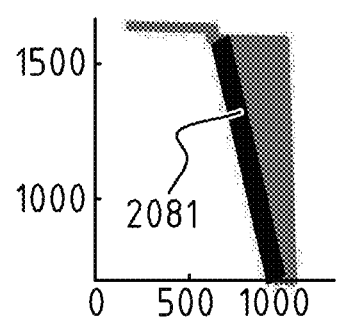
Figure 5I:
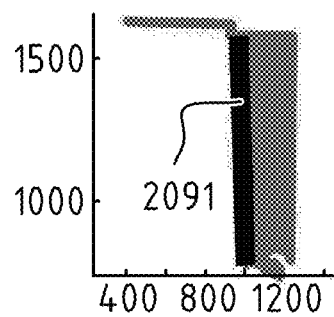
Figure 5J:
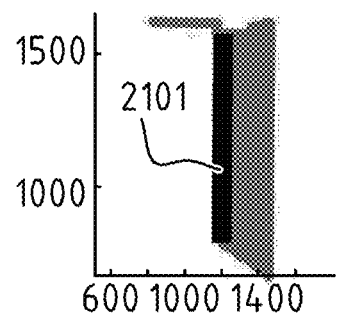
Figure 5K:
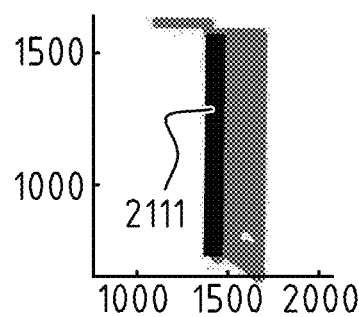
Figure 5L:
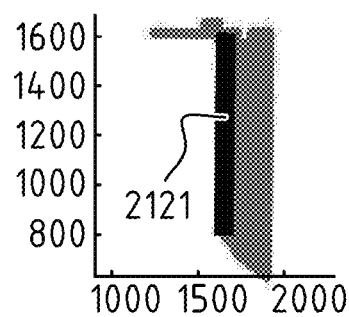
Figure 5M:
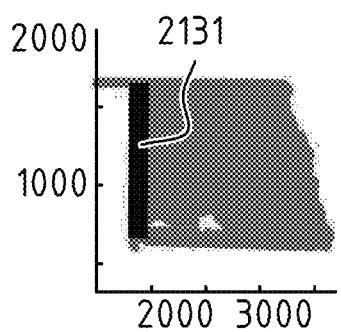

Step 8. For each step and floor part (200, 201, 202, . . . 213) determine the outer edge line of the respective extracted point cloud set:

8.1 Determine points of each extracted point cloud set that belong to the boundary of each step and floor part (200, 201, 202, . . . 213) (in FIG. 3A-N: the outer edges of the grey two-dimensional shapes).

8.2 Generate a boundary polygon from the determined points of the boundary points of the extracted point cloud set for each step and floor part (200, 201, 202, . . . 213).

8.3 Determine and remove points belonging to spikes from the point cloud set, and repeat determination of the points of the cloud set that belong to the boundary.

8.4 Determine a fixed number (preferably three) of straight lines (2011, 2012, 2013; . . . 2131, 2132, 2133) in the boundary via an iterative robust line-fitting algorithm, such as RANSAC, which determines the (preferably three) most dominant lines that comprise the most points in the boundary.

As shown in FIGS. 3A-N, in this manner for each step three straight lines (2011, 2012, 2013; . . . 2131, 2132, 2133) are determined, which can each be defined by the x, y, z-coordinates of their respective endpoints.

8.5 For each step and floor part: from the determined lines, determine one line (2021, . . . 2131) that (best) divides points that correspond to two subsequent steps and floor parts (200, 201, 202, . . . 213), as shown in FIGS. 4A-M, by detecting a difference in the elevation (z-values) of points of the cloud on either side of the determined lines. Said determined one line (2011, 2021, . . . 2131) is hereafter called the edge line of their respective steps and floor part (201, 202, . . . 213).

Step 9. Assign an elevation, i.e. a z-value, to each detected edge line (2011, 2021, . . . 2131), by calculating the median value of the points elevations of the point cloud cluster corresponding to the respective steps (201, 202, . . . 213) as determined after steps 1-7.

FIGS. 4A-M, FIGS. 5A-M and FIG. 6 show the so identified edge line of each step (201, 202, . . . 213) in 2D as thick straight lines (2011, 2021, . . . 2131). Each of said edge lines (2011, 2021, . . . 2131) thus forms the representation of a step (201, 202, . . . 213) which are each defined by a pair of x, y, z-coordinates of their respective endpoints, which pairs of x, y, z-coordinates are stored in memory.

Next, a representation of the adjacent walls (101, 102) may be determined, as follows:

Step 10. Determine the number of expected walls (101, 102) using the determined edge lines (2011, 2021, . . . 2131) of the steps (201, 202, . . . 213), based on changes in the direction of a line that connects the midpoints of said lines (2011, 2021, . . . 2131).

Step 11. For each expected wall (101, 102) determine initial vertical (indefinite) planes through the x, y, z-coordinates of the respective endpoints of the respective lines (2011, 2021, . . . 2131).

Step 12. Select the points of the original point cloud that belong to a space of a predetermined width on either side of the determined initial vertical planes.

Step 13. Adjust the position of the initial vertical planes by applying to the selected points inside said space a robust plane-fitting algorithm (e.g. RANSAC) which detects vertical planes (up to a deviation of approximately 5 degrees), in order to determine the position of the vertical planes of the walls.

Step 14. Determine wall representation lines (1011, 1021) by intersecting two steps' lines with the respective vertical planes of the walls.

FIG. 6 shows the so identified wall in 2D as thick straight wall representation lines (1011, 1021) (1011, 1021). Each of said lines (1011, 1021) thus forms the representation of a wall (101, 102), which are each defined by a pair of x, y, z-coordinates of their respective endpoints, which pairs of x, y, z-coordinates are stored in memory.

The final step of the method may be:

Step 15. Export the pair of x, y, z-coordinates of the respective endpoints that define the respective steps and walls to an digital file, for instance a csv-file.

The output of the above method is a meaningful geometric representation of the staircase geometry, which is compatible with an (automatic) stair lift design algorithm. In particular the output of the above method is that each step and each wall is described by two three-dimensional coordinates of two respective endpoints of a straight line defining the respective step or wall.

The output of the above method is used to design and produce a rail for a stair lift, or alternatively may also be used for designing and producing a handrail for a staircase. The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A method for the extraction of information about a staircase, wherein use is made of:
   a 3D scanning device which is arranged to obtain point clouds of surfaces of objects; and
   a computer device comprising:
      a central processing unit loaded with a computer program;
      a digital memory connected to the central processing unit;
      input means connected to the central processing unit; and
      output means connected to the central processing unit;
   wherein the method comprises:
      scanning the staircase with the 3D scanning device to obtain a point cloud of the surface of the staircase, wherein the point cloud includes points corresponding to substantially horizontal surfaces of respective steps of the staircase;
      calculating the estimated normal vector of at least a part of the points of the point cloud, including at least a part of the points that correspond to the substantially horizontal surfaces of the steps of the staircase;
      filtering said at least part of the points of the point cloud based on their normal vectors by ignoring points which do not have a normal vector with a substantially vertically upward direction;

ordering the remaining points into sets of points based on their vertical elevation, so that each set of points represents a respective step of the staircase;

determining a straight edge line of each set, which edge line represents the respective step; and storing a numerical representation of each determined edge line in the digital memory.

2. The method of claim 1, further comprising the following steps for ordering the remaining points into sets of points based on their vertical elevation:

determining one or more expected number of steps based on the difference in elevation of the bottom points and the upper points of the filtered point cloud and a predetermined step height value;

applying to the filtered point cloud a robust plane fitting algorithm which detects horizontal planes, such as RANSAC, by using the expected number of steps; and determining the vertical elevation of said horizontal planes.

3. The method of claim 1, further comprising the following step:

before determining the straight edge line of each set of points, dividing the points of each set into clusters which have no mutual connection, calculate the largest cluster, and ignoring the points of the smaller cluster(s).

4. The method of claim 1, further comprising the following step:

before determining the straight edge line of each set of points, calculating the center of mass of the set of points and determine the number of points inside a predetermined radius around the center of mass, and dismissing sets of points which have a number of points below a predetermined value.

5. The method of claim 1, further comprising the following step:

before determining the straight edge line of each set of points, filtering the points of the sets by applying a principal component analysis (PCA), in order to exclude thin objects detected as planes.

6. The method of claim 1, wherein determining the straight edge line of each set of points comprises:

determining boundary points of each set of points that belong to the boundary of said set of points;

determining a fixed number of most dominant straight lines in the boundary, the most dominant lines being the lines that comprise the most points in the boundary; and determine said edge line among said determined most dominant lines, by selecting from said most dominant lines the line which shows a difference in the elevation of points of the point cloud on either side of said line.

7. The method of claim 1, wherein determining a fixed number of most dominant straight lines in the boundary is done with an iterative robust line-fitting algorithm.

8. The method of claim 1, further comprising the following step:

assigning an elevation to each determined edge line by calculating the median value of the elevations of the points of the corresponding set of points.

9. The method of claim 1, wherein the numerical representation of each determined edge line comprises three-dimensional coordinates of the two respective endpoints of said edge line.

10. A method for the extraction of information about a staircase, wherein the method is used for designing and making a stair lift comprising a guide which is installed at the staircase and along which a frame on which a person can be seated can move, wherein use is made of:

a 3D scanning device which is arranged to obtain point clouds of surfaces of objects; and a computer device comprising:

a central processing unit loaded with a computer program;

a digital memory connected to the central processing unit;

input means connected to the central processing unit;

output means connected to the central processing unit;

wherein the method comprises:

scanning the staircase with the 3D scanning device to obtain a point cloud of the surface of the staircase;

calculating the estimated normal vector of at least a part of the points of the point cloud;

filtering said at least part of the points of the point cloud based on their normal vectors by ignoring points which do not have a normal vector with a substantially vertically upward direction;

ordering the remaining points into sets of points based on their vertical elevation, so that each set of points represents a step;

determining a straight edge line of each set, which edge line represents the respective step; and storing a numerical representation of each determined edge line in the digital memory.

11. The method according to claim 1, wherein the 3D scanning device and the computer device are comprised in one housing.

12. A computer device, comprising:

a central processing unit loaded with a computer program;

a digital memory connected to the central processing unit; and output means connected to the central processing unit;

wherein the computer program comprises instructions for carrying out the method in accordance with claim 1.

13. A non-transitory computer readable carrier comprising a computer program comprising instructions for carrying out the method in accordance with claim 1.

14. The method according to claim 7, wherein the iterative robust line-fitting algorithm comprises RANSAC.

15. The method according to claim 10, wherein the guide comprises a rail.

* * * * *